(12) United States Patent
Takahashi

(10) Patent No.: US 6,980,444 B2
(45) Date of Patent: Dec. 27, 2005

(54) SWITCHING POWER SUPPLY

(75) Inventor: Satoru Takahashi, Otsu (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/947,274

(22) Filed: Sep. 23, 2004

(65) Prior Publication Data
US 2005/0078492 A1 Apr. 14, 2005

(30) Foreign Application Priority Data
Oct. 9, 2003 (JP) .............................. 2003-350530

(51) Int. Cl.[7] .......................................... H02M 3/335
(52) U.S. Cl. .............................. 363/21.18; 363/21.16; 363/97
(58) Field of Search ............................. 363/20, 21.07, 363/21.08, 21.09, 21.1, 21.11, 21.15, 21.16, 363/21.17, 21.18, 49, 97, 131

(56) References Cited

U.S. PATENT DOCUMENTS 6,023,178 A * 2/2000 Shioya et al. ............... 327/176
6,101,106 A * 8/2000 Shi ............................... 363/41
6,154,377 A * 11/2000 Balakrishnan et al. .... 363/21.01
6,381,151 B1 * 4/2002 Jang ......................... 363/21.01
6,914,789 B2 * 7/2005 Kinoshita et al. ......... 363/21.12

FOREIGN PATENT DOCUMENTS

JP          5-30735         2/1993

* cited by examiner

Primary Examiner—Gary L Laxton
(74) Attorney, Agent, or Firm—Steptoe & Johnson LLP

(57) ABSTRACT

It is an object to control the peak of drain current and control overload in a same switching device in a switching power supply which has a load of a transformer and so on, and to prevent a complicated circuit and an increase in the number of terminals of a control circuit. Overload protection is performed as follows: according to a change in a feedback current which is an input to a feedback signal control circuit, the peak value of the current of a switching element, a switching operation is performed intermittently to reduce power consumption when the feedback current decreases at a light load, and an increase in the voltage of an FB terminal is detected and the switching operation is stopped in an overload state where overload protection is performed on the switching element.

12 Claims, 14 Drawing Sheets

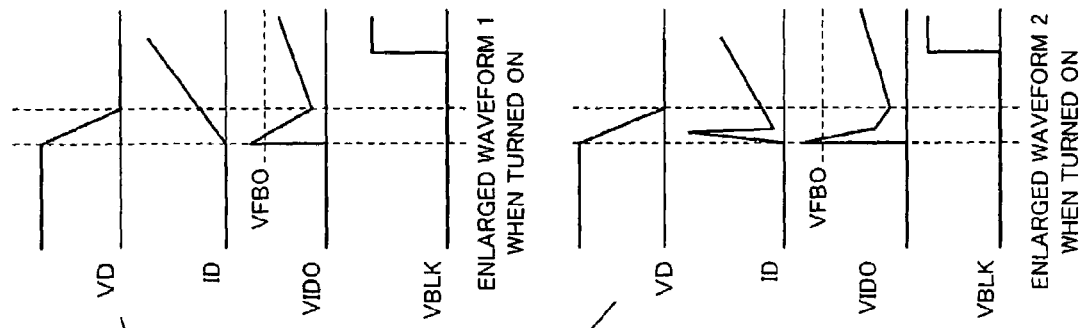
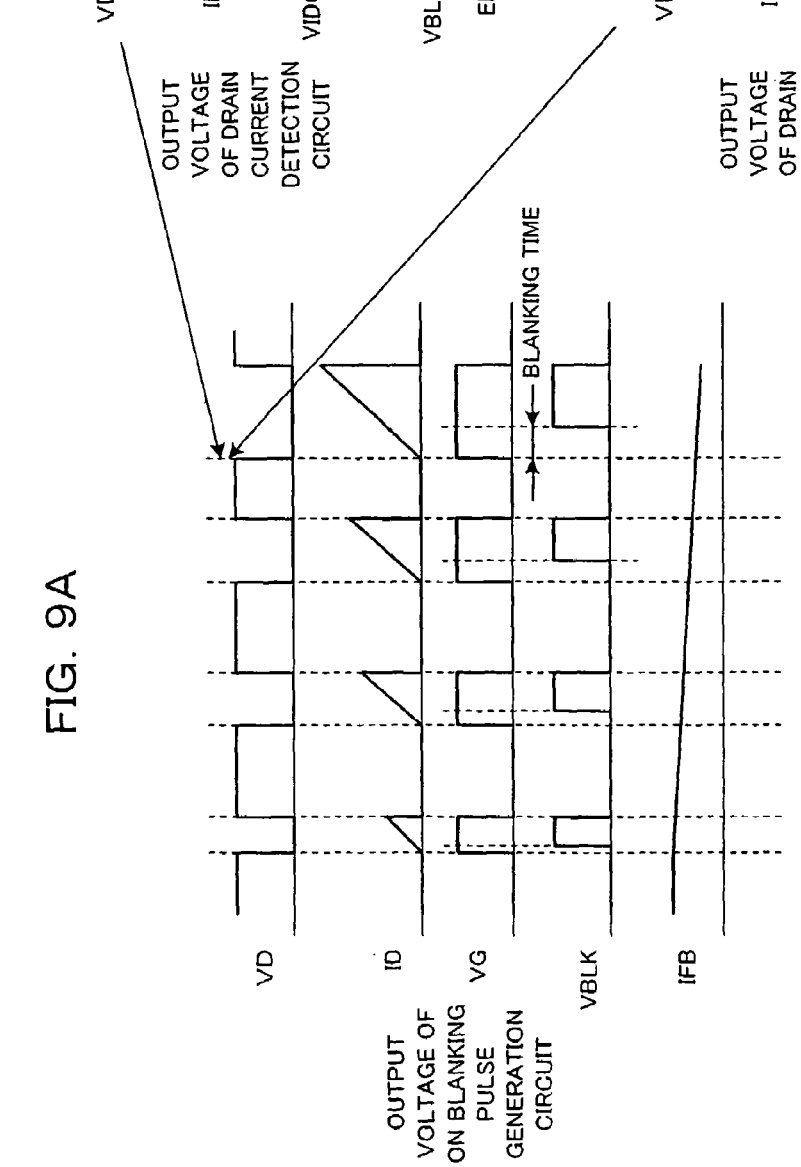

SWITCHING POWER SUPPLY

BACKGROUND OF THE INVENTION

1. Field of the Invention

The present invention relates to a switching power supply and particularly relates to a switching power supply which reduces power consumption at no load and a light load and has an overload protecting function.

2. Description of Related Art

FIG. 10 is a circuit diagram showing an example of a conventional switching power supply. Each constituent block will be discussed below (e.g., Japanese Patent Laid-Open No. 5-30735).

In FIG. 10, a semiconductor device 130 for controlling a switching power supply is constituted of a switching element 101 and the control circuit thereof.

The semiconductor device 130 comprises, as external input terminals, five terminals of an input terminal (DRAIN) of a switching element 101, an auxiliary power supply voltage input terminal (VCC), an internal circuit power supply terminal (VDD), a feedback signal input terminal (FB), the output terminal of the switching element 101, and the GND terminal (GND) of the control circuit.

A regulator 102 for supplying an internal circuit power supply of the semiconductor device 130 comprises a switch 102A for supplying starting current to VCC and a switch 102B for supplying current from VCC to VDD.

A starting constant current source 103 for supplying starting circuit current supplies starting current to VCC via the switch 102A upon startup.

A start/stop circuit 107 for controlling start/stop of the semiconductor device 130 detects the voltage of VDD. When the voltage of VDD is equal to or lower than a certain voltage, the start/stop circuit 107 outputs a signal for stopping the switching operating of the switching element 101 to a NAND circuit 105.

A drain current detection circuit 106 detects an on voltage of the switching element 101, the on voltage being generated as a product of a current applied to the switching element 101 and an on resistance of the switching element 101, so that a current applied to the switching element 101 is detected. The drain current detection circuit 106 converts a detected current value of the switching element 101 into a voltage signal and outputs a voltage signal corresponding to the current value of the switching element 101 to a comparator 108.

In a feedback signal control circuit 111, a current signal inputted to the FB terminal is converted into a voltage signal and the signal is outputted to the comparator 108.

The comparator 108 outputs an "H" signal to an AND circuit 115 when the output signal from the feedback signal control circuit 111 and the output signal from the drain current detection circuit 106 are equal to each other.

An on blanking pulse generation circuit 114 outputs an "L" signal over a period of time since the "B" signal is inputted to the gate of the switching element 101, and outputs the "H" signal after the period of time. Since a current is detected by detecting the on voltage of the switching element 101, a current detection circuit detects a value larger than an actual current. This is because the on voltage does not sufficiently decrease despite that the actual current is low from when the switching element 101 is turned on to when the on voltage decreases. The on blanking pulse generation circuit 114 prevents such an erroneous detection.

The AND circuit 115 outputs a signal to the reset terminal of an RS flip-flop circuit 110 in response to the output signal of the comparator 108 and the input from the on blanking pulse generation circuit 114.

A clamping circuit 112 determines a maximum value of the output signal of the feedback signal control circuit 111. The maximum value determines the maximum value of current applied to the switching element 101 and provides overcurrent protection for the switching element 101.

An oscillator circuit 109 outputs a maximum duty cycle signal 109A for determining the maximum duty cycle of the switching element 101 and a clock signal 109B for determining an oscillation frequency of the switching element 101. The maximum duty cycle signal 109A is inputted to the NAND circuit 105 and the clock signal 109B is inputted to the set terminal of the RS flip-flop circuit 110.

The output signal of the start/stop circuit 107, the maximum duty cycle signal 109A, and the output signal of the RS flip-flop circuit 110 are inputted to the NAND circuit 105. The output signal of the NAND circuit 105 is inputted to a gate drive circuit 104 to control the switching operation of the switching element 101. Simultaneously the output signal of the gate drive circuit 104 is inputted to the on blanking pulse generation circuit to generate a blanking pulse signal.

A transformer 140 has a primary winding 140A, a secondary winding 140B, and a primary auxiliary winding 140C.

A rectifying/smoothing circuit constituted of a diode 131 and a capacitor 132 is connected to the primary auxiliary winding 140C and is used as an auxiliary power supply of the semiconductor device 130. The auxiliary power supply is inputted to VCC.

A capacitor 133 is inserted between the VDD terminal and GND to stabilize VDD.

A control signal transmission circuit 135 for transmitting a control signal from the secondary side to the primary side is constituted of a phototransistor 135A and a photodiode 135B. The collector of the phototransistor 135A is connected to FB and the emitter of the phototransistor 135A is connected to GND.

A rectifying/smoothing circuit constituted of a diode 150 and a capacitor 151 is connected to the secondary winding 140B. The photodiode 135B, a secondary-side control circuit 158, and a load 157 are connected to the rectifying/smoothing circuit.

The secondary-side control circuit 158 is constituted of a shunt regulator 152, resistors 154, 155, and 156, and a capacitor 153. Voltage divided by the detection resistors 154 and 155 of a secondary side output voltage VO is inputted to the reference of the shunt regulator 152, and a current applied to the photodiode 135B connected to the cathode of the shunt regulator 152 is controlled so as to have a constant secondary side output voltage VO.

Referring to FIGS. 10 and 11, the operations of the switching power supply configured thus will be described below. FIG. 11 is a time chart for explaining the operation waveforms of parts shown in FIG. 10.

In FIG. 10, a direct voltage VIN generated by, e.g., rectifying and smoothing a commercial AC power supply is inputted to the input terminal. VIN is applied to the DRAIN terminal of the semiconductor device 130 via the primary winding 140A of the transformer 140.

Then, starting current generated by a starting constant current source 103 is applied through the switch 102A in the regulator 102 to charge the capacitor 132 connected to VCC, so that the voltage of VCC increases. Since the switch 102B in the regulator 102 operates so that VDD has a constant voltage, the starting current partially charges the capacitor 133 connected to VDD via the switch 102B. Thus, the voltage of VDD also increases.

When VCC increases in voltage and reaches a starting voltage set in the start/stop circuit 107, the switching operation of the switching element 101 is started. When the switching operation is started, energy is supplied to the windings of the transformer 140 and thus current is applied to the secondary winding 140B and the primary auxiliary winding 140C.

Current applied to the secondary winding 140B is rectified and smoothed by the diode 150 and the capacitor 151 into direct current power and the power is supplied to the load 157.

Since the switching operation is repeated, the output voltage VO gradually increases. When the output voltage VO reaches a voltage set in output voltage detection resistors 154 and 155, a current applied to the photodiode 135B increases in response to a signal from the secondary-side control circuit 158.

Then, a current applied to the phototransistor 135A increases and a current applied from the FB terminal also increases.

When the current of the FB terminal (hereinafter referred to as IFB) increases, a voltage inputted to the comparator 108 (hereinafter referred to as VFBO) decreases and thus the drain current applied to the switching element 101 decreases. Such a negative feedback stabilizes the output voltage VO.

The current applied to the primary auxiliary winding 140C is rectified and smoothed by the diode 131 and the capacitor 132 and is used as the auxiliary power supply of the semiconductor device 130 and supplies current to the VCC terminal. Once VCC reaches the starting voltage, the switch 102A in the regulator 102 is turned-off. Thus, the current of the semiconductor device is supplied from the primary auxiliary winding 140C after startup. Since the primary auxiliary winding 140C has the same polarity as the secondary winding 140B, VCC is proportionate to the output voltage VO.

When an output current IO applied to the load 157 decreases after the output voltage VO is stabilized, IFB increases, VFBO decreases, and the drain current applied to the switching element 101 decreases. At this point, no matter how much the output current IO decreases, the drain current is not reduced to 0 and a small amount of drain current, which is determined by a blanking pulse outputted from the blanking pulse generation circuit, keeps flowing.

Further, when the output current IO applied to the load 157 increases, IFB decreases, VFBO increases, and the drain current applied to the switching element 101 increases according to the increase of IO. When VFBO increases and reaches a voltage set in the clamping circuit 112, overcurrent protection is performed and thus the drain current is clamped at a constant current ILIMIT.

However, in an overload state, even when the drain current of the switching element 101 is clamped, the output voltage VO decreases and the output current IO keeps increasing. Thus, an output current-voltage characteristic shown in FIG. 14 is obtained where the overload protection of the power supply does not sufficiently work.

FIG. 12 shows another conventional example where a power supply has an overload protecting function (e.g., Japanese Patent Application No. 2002-136674, which is unpublished and filed by the same applicant).

FIG. 12 is different from FIG. 10 in that an output current detection resistor 159, an overcurrent detection circuit 160, and an over current signal transmission circuit 136 are provided. In FIG. 12, when the output current IO reaches a certain value or higher, a current applied to a photodiode 136B increases, a current is applied from a power supply voltage VDD to GND via a phototransistor 136A, and the voltage of the VDD terminal decreases. Thus, a stop signal is outputted from a start/stop circuit 107, the switching operation of a switching element 101 is stopped, the overload protecting function of a power supply is performed, and an output current-voltage characteristic shown in FIG. 15 is obtained. The configuration of FIG. 12 cannot avoid an increase in the number of components.

As a conventional technique, the following method is available: a state of overload on the secondary side is detected by a voltage detection circuit composed of a shunt regulator and split resistors, an overload signal is transmitted by a photocoupler to the primary side, and the oscillation of an IC for switching control is stopped. For example, this configuration is disclosed in Japanese Patent Laid-Open No. 5-30735 in which current is applied from a photodiode connected to the terminal of an IC, so that the oscillation of the IC is stopped. However, this method requires another terminal only for stopping an overload.

Another conventional technique is a method disclosed in a patent document (Japanese Patent Laid-Open No. 2003-333843) in which a terminal other than an FB terminal for overload protection is provided so as to detect a reduced output voltage in an overload state, and a clamp voltage variable circuit reduces the oscillation frequency and the maximum current of a switching element, so that overcurrent protection is performed.

However, this method requires a terminal in addition to a feedback terminal, resulting in a complicated configuration.

In general, a switching power supply requires an overload protecting function. It is desired to minimize an output current in an overload state in order to prevent the parts of the switching power supply from liberating heat or being broken even when the overload state continues.

For this reason, the primary side generally has an overcurrent protecting function which prevents a current higher than a certain value from flowing to the switching element.

However, overcurrent protection only on the primary side cannot reduce an output current to a certain value or lower in the power supply.

Further, in order to solve this problem, another solution is necessary. For example, the output current and output voltage of the secondary side are detected and the switching operation of the primary side is stopped. Thus, the cost and the number of components are increased.

Moreover, the conventional structural examples cannot sufficiently reduce power consumption at no load and a light load.

SUMMARY OF THE INVENTION

In view of these problems, it is an object of the present invention to provide a switching power supply capable of overload protection with a simple configuration.

In order to solve these problems, a switching power supply of a first invention, comprising a transformer, a switching element which has an input terminal connected to a first primary winding of the transformer and receives a first direct voltage via the transformer, an output voltage generation circuit which is connected to a secondary winding of the transformer and rectifies and smoothes a secondary-side output voltage of the transformer, so that a second direct voltage smaller than an absolute value of the first direct voltage is generated and outputted from the first direct voltage, an output voltage control circuit for stabilizing an output voltage, a control signal transmission circuit for transmitting a signal of the output voltage control circuit to the primary side, a control circuit for controlling an operation of the switching element, and an auxiliary power supply voltage generation circuit which is connected to an auxiliary winding of the transformer, generates a primary-side output voltage, and rectifies and smoothes the generated primary-side output voltage, so that an auxiliary power supply voltage for supplying a power supply voltage to the control circuit is generated and outputted.

The control circuit comprises a regulator for generating and supplying a power supply voltage of the control circuit from the first direct voltage and the auxiliary power supply voltage, an oscillator circuit for generating and outputting a switching signal applied to the switching element, a current detection circuit for detecting a current applied to the switching element and outputting the current as an element current detection signal, a feedback signal control circuit for outputting a signal from the control signal transmission circuit as a feedback signal, a comparator for comparing the element current detection signal with the output signal of the feedback signal control circuit, and outputting a comparison signal, a switching signal control circuit for controlling an amount of current and an output of the switching signal, a clamping circuit for fixing the maximum value of the element current detection signal, a light load mode detecting comparator for comparing an output voltage of the feedback signal control circuit with an internally set light load reference voltage source, and a feedback voltage detection circuit which detects an input voltage to the feedback signal control circuit, and outputs a switching stop signal when the input voltage is equal to or higher than a specified voltage.

With this configuration, a current peak of the switching element is controlled and an intermittent operation is performed in response to a signal to the feedback signal control circuit, and an operation of the switching element is stopped according to an increase in input voltage to the feedback signal control circuit.

As compared with the control circuit of the first invention, a control circuit in a switching power supply of a second invention does not have the light load mode detecting comparator and the feedback voltage detection circuit as necessary constituent elements, and has an on blanking pulse generation circuit instead that changes time of a blanking width outputted in response to an input from the switching signal control circuit. The current detection circuit detects an on voltage of the switching element to output the element current detection signal and changes on blanking time of an output signal from the on blanking pulse generation circuit according to a current peak value of the switching element.

As compared with the control circuit of the first invention, a control circuit in a switching power supply of a third invention additionally comprises an on blanking pulse generation circuit for changing blanking time in response to the input from the switching signal control circuit. A current peak of the switching element is controlled and an intermittent operation is performed in response to a signal to the feedback signal control circuit, an operation of the switching element is stopped according to an increase in input voltage to the feedback signal control circuit, the current detection circuit detects an on voltage of the switching element to output the element current detection signal and changes on blanking time of an output signal from the on blanking pulse generation circuit according to a current peak value of the switching element.

The switching power supply of the present invention is configured thus. A signal from a secondary-side control circuit is transmitted to the input terminal of a single feedback signal control circuit via a single control signal transmission circuit, so that a current peak value of a primary-side switching element is controlled and overload protection is readily achieved by a signal transmitted to the primary side by the same control signal transmission circuit.

In addition to this effect, power consumption can be reduced at a light load and no load.

Further, on blanking time is changed in response to the input signal to the feedback signal control circuit, so that it is possible to prevent a malfunction in overcurrent protection when the switching element is turned on, and prevent output voltage from being increased by an insufficient reduction in the current peak value of the switching element at a light load.

BRIEF DESCRIPTION OF THE DRAWINGS

FIGS. 9A, 9B, and 9C are time charts for explaining the soft start of the switching power supply according to Embodiment 2 of the present invention;

DESCRIPTION OF THE PREFERRED EMBODIMENTS

The following will describe embodiments of the present invention with reference to the accompanying drawings.

Embodiment 1

Figure 1:
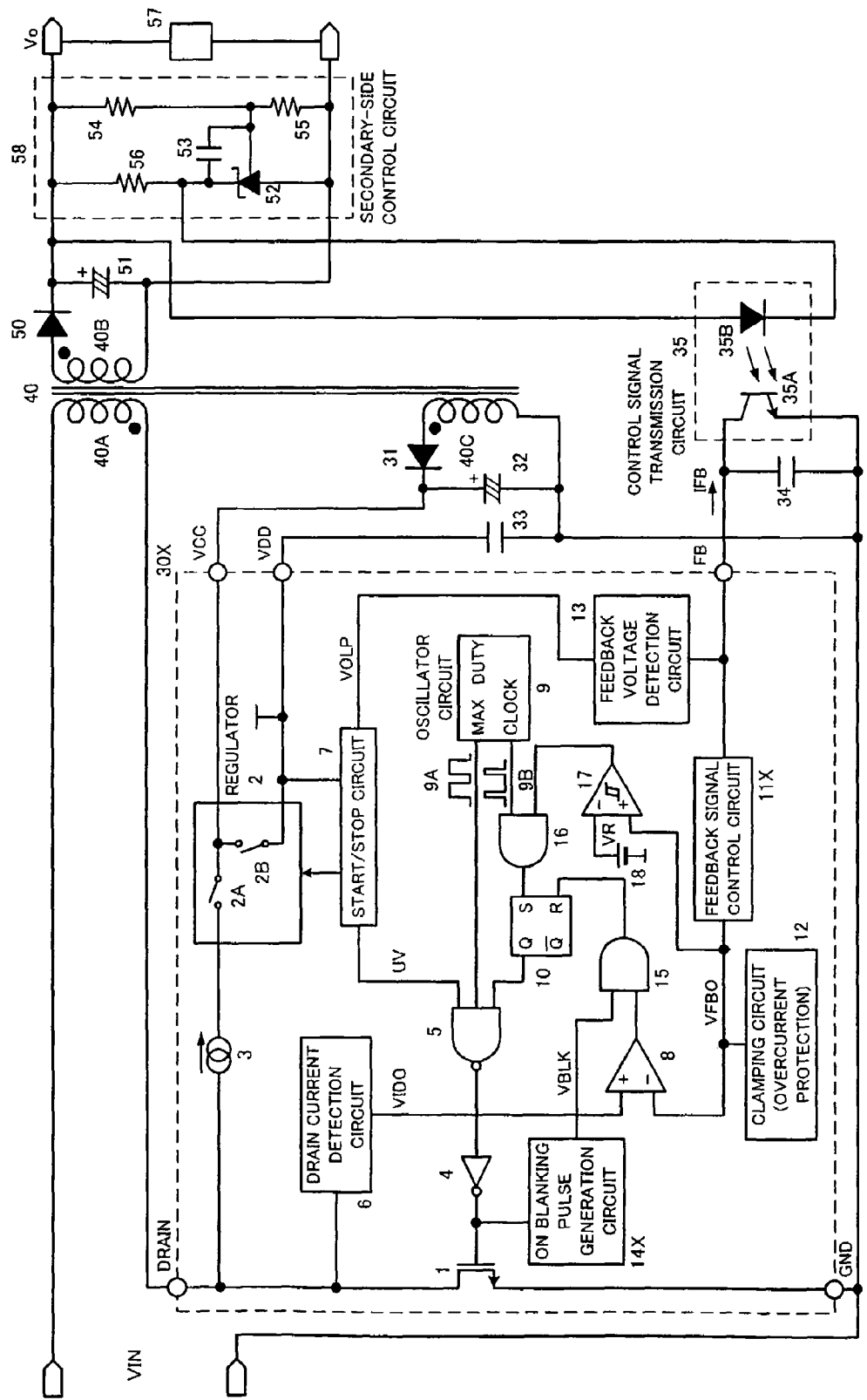
FIG. 1 is a circuit diagram showing a switching power supply according to Embodiment 1 of the present invention.

FIG. 1 is a circuit diagram showing an example of an embodiment of a switching power supply and a semiconductor device according to the present invention. Each constituent block will be discussed below.

In FIG. 1, a semiconductor device 30X for controlling the switching power supply is constituted of a switching element 1 and the control circuit thereof.

The semiconductor device 30X comprises, as external input terminals, an input terminal (DRAIN) of the switching element 1, an auxiliary power supply voltage input terminal (VCC), an internal circuit power supply terminal (VDD), a feedback signal input terminal (FB), the output terminal of the switching element 1, and the GND terminal (GND) of the control circuit.

A regulator 2 for supplying an internal circuit power supply of the semiconductor device 30X comprises a switch 2A for supplying starting current to VCC and a switch 2B for supplying current from VCC to VDD.

The switch 2A is turned on until VCC reaches a certain voltage, and supplies starting current to VCC. The switch 2B supplies current from VCC to VDD until VDD reaches a certain potential. When VDD reaches the certain potential, the switch 2b stops supplying current, so that VDD is kept at the certain potential.

A starting constant current source 3 for supplying starting circuit current supplies starting current to VCC via the switch 2A upon startup.

A start/stop circuit 7 controls start/stop of the semiconductor device 30X and detects the voltage of VDD. When the voltage is equal to or lower than a certain voltage, the start/stop circuit 7 outputs a signal for stopping the switching operating of the switching element 1 to a NAND circuit 5.

Further, in response to an output VOLP from a feedback voltage detection circuit 13, the start/stop circuit 7 outputs a signal for stopping the switching operation of the switching element 1 to the NAND circuit 5.

A drain current detection circuit 6 detects a current applied to the switching element 1, converts the detected current into a voltage signal, and outputs the signal to a comparator 8.

A feedback signal control circuit 11X converts a current signal flowing from an FB terminal into a voltage signal and outputs the signal to the comparator 8.

During startup in which the switching element 1 performs the switching operation, a constant current is supplied to charge a capacitor 34 even when a phototransistor 35A between FB and GND is turned off, thereby increasing the voltage of the FB terminal.

The feedback voltage detection circuit 13 outputs an overload signal (VOLP) to the start/stop circuit to stop the switching operation of the switching element 1 when the voltage of the FB terminal increases to a certain voltage or higher. At the same time, the feedback voltage detection circuit 13 stops supplying a constant current for charging the capacitor 34 to the feedback signal control circuit 11X, and outputs a signal to operate a device for discharging the capacitor 34.

The comparator 8 outputs an "H" signal to an AND circuit 15 when the output signal from the feedback signal control circuit 11X and the output signal from the drain current detection circuit 6 are equal to each other. The AND circuit 15 receives an input from an on blanking pulse generation circuit 14X as another input and outputs a signal to the reset terminal of an RS flip-flop circuit 10.

When the two signals to the AND circuit 15 are in "H" state, a reset signal is outputted to the reset terminal of the RS flip-flop circuit 10 and the signal is processed through the NAND circuit 5 and a gate driver 4 so as to turn off the switching element 1.

The on blanking pulse generation circuit 14X outputs an "L" signal to the NAND circuit 15 over a period of time since the "H" signal is outputted from the gate driver 4, and outputs the "H" signal after the period of time. On blanking time is time from when the "H" signal for turning on the switching element 1 is outputted from the gate driver 4 to when the output signal from the on blanking pulse generation circuit 14X is set at "H".

That is, in the on blanking pulse generation circuit 14X, the "L" signal serving as a blanking signal is generated over a period of time since the switching element 1 is turned on, and the signal is outputted to the NAND circuit 5. Thus, relative to a comparison signal of the output signal from the feedback signal control circuit 11X and the output signal from the drain current detection circuit 6, the output of the AND circuit 15 is forcibly set at "L" for a period of time since the switching element 1 is turned on, and an operation is performed so as not to transmit a reset signal to the reset terminal of the RS flip-flop.

A clamping circuit 12 determines the maximum value of the output signal of the feedback signal control circuit. The maximum value determines the maximum value (ILIMIT) of current applied to the switching element 1 and provides overcurrent protection for the switching element 1.

A light load reference voltage source 18 is connected to a light load detecting comparator 17 as a reference voltage VR.

The comparator 17 outputs an "L" signal when the peak value of the drain current of the switching element 1 decreases to about 15% of ILIMIT, which is an overcurrent protection level, and the comparator 17 outputs an "H" signal to cause the drain current recovers to about 20% of ILIMIT.

That is, the light load reference voltage source 18 switches and outputs the two kinds of voltage in response to the output of the comparator 17.

An oscillator circuit 9 outputs a maximum duty cycle signal 9A for determining a maximum duty cycle of the switching element 1 and a clock signal 9B for determining an oscillation frequency of the switching element 1.

The maximum duty cycle signal 9A is inputted to the NAND circuit 5 and the clock signal 9B is inputted to an AND circuit 16.

The output signal of the light load detecting comparator 17 and the clock signal 9B of the oscillator circuit 9 are inputted to the AND circuit 16, which outputs a signal to the set terminal of the RS flip-flop circuit 10. That is, only when the signal from the light load detecting comparator is "H", the clock signal 9B is inputted to the set terminal of the RS flip-flop circuit 10.

The output signal of the start/stop circuit 7, the maximum duty cycle signal 9A, and the output signal of the RS flip-flop circuit 10 are inputted to the NAND circuit 5. The output signal of the NAND circuit 5 is inputted to the gate driver 4 to control the switching operation of the switching element 1.

A transformer 40 has a primary winding 40A, a secondary winding 40B, and a primary auxiliary winding 40C.

A rectifying/smoothing circuit constituted of a diode 31 and a capacitor 32 is connected to the primary auxiliary winding 40C and is used as an auxiliary power supply of the semiconductor device 30X. The auxiliary power supply is inputted to VCC.

Reference numeral 33 denotes a capacitor for stabilizing VDD.

Reference numeral 35 denotes a control signal transmission circuit for transmitting a control signal from the secondary side to the primary side. The circuit is constituted of a phototransistor 35A and a photodiode 35B. The collector of the phototransistor 35A is connected to FB and the emitter of the phototransistor 35A is connected to GND.

A rectifying/smoothing circuit constituted of a diode 50 and a capacitor 51 is connected to the secondary winding 40B. The secondary winding 40B is connected to the photodiode 35B, a secondary-side control circuit 58, and a load 57.

The secondary-side control circuit 58 is constituted of a shunt regulator 52, resistors 54, 55, and 56, and a capacitor 53. Voltage divided by the detection resistors 54 and 55 of a secondary-side output voltage VO is inputted to the reference of the shunt regulator 52, and a current applied to the photodiode 35B connected to the cathode of the shunt regulator is controlled so as to have a constant secondary-side output voltage VO.

Figure 7:
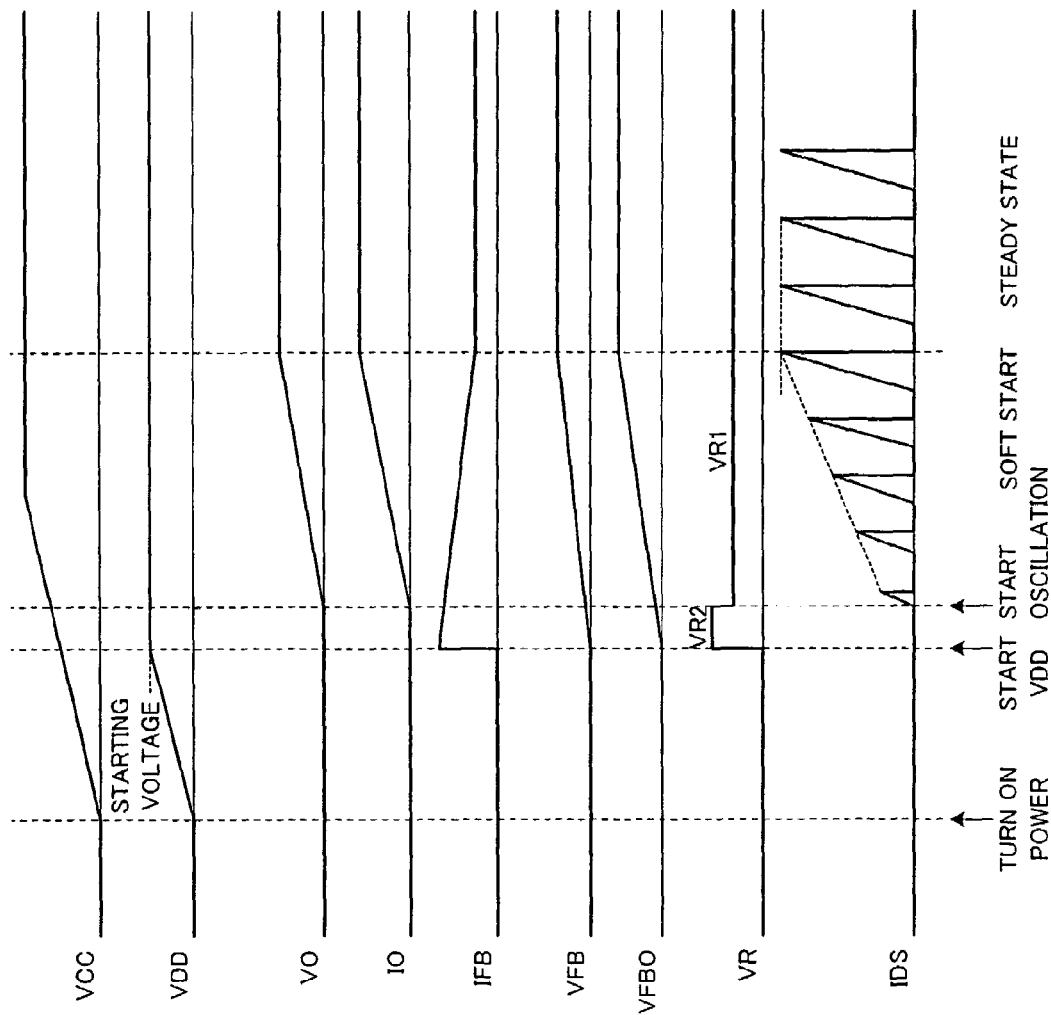
FIG. 7 is a time chart for explaining the soft start of the switching power supply according to Embodiment 1 of the present invention.
Figure 8:
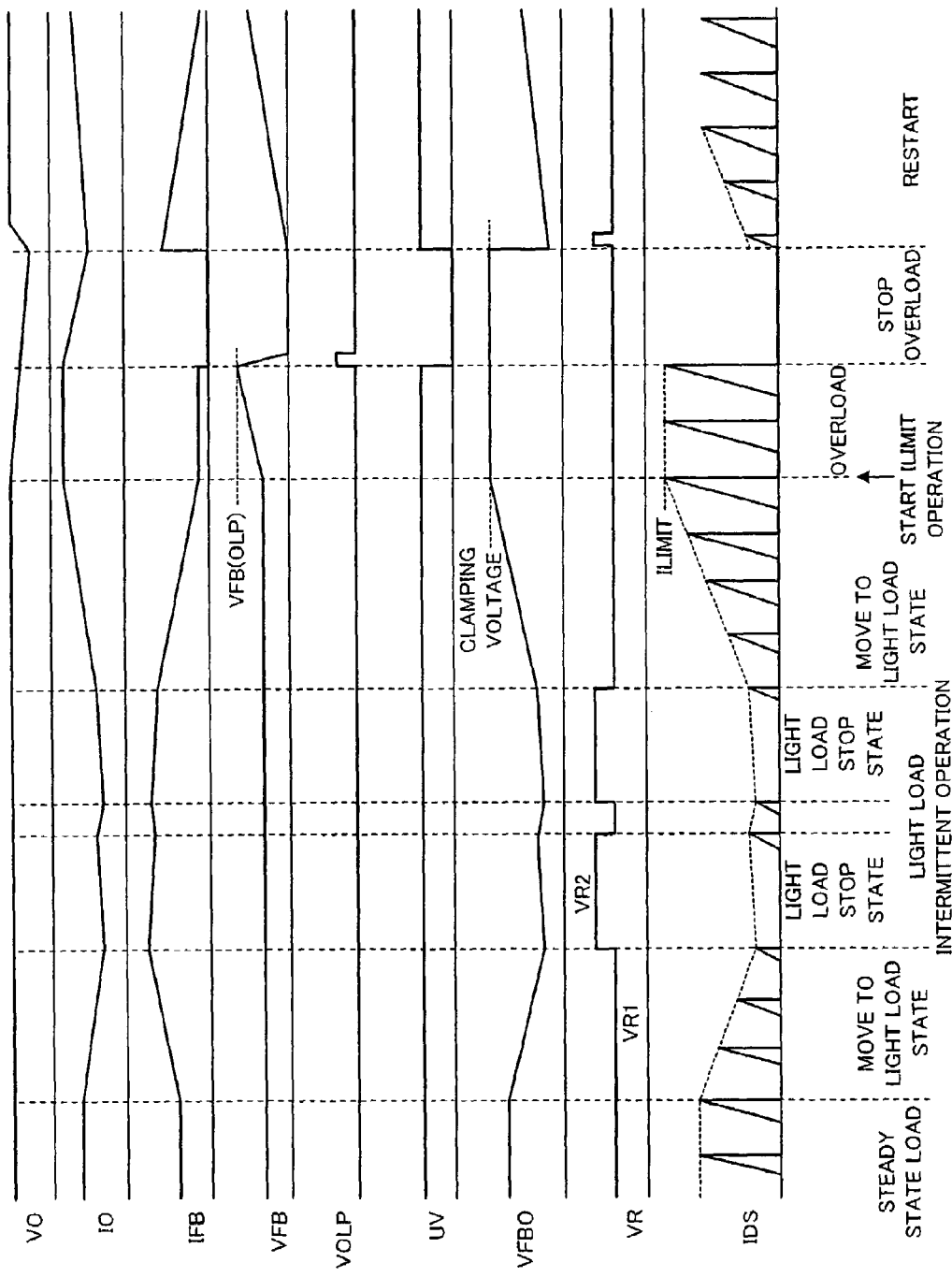
FIG. 8 is a time chart for explaining a transition from a steady operation to a light load intermittent operation and a recovery from the light load intermittent operation in the switching power supply according to Embodiment 1 of the present invention.
Figure 10:
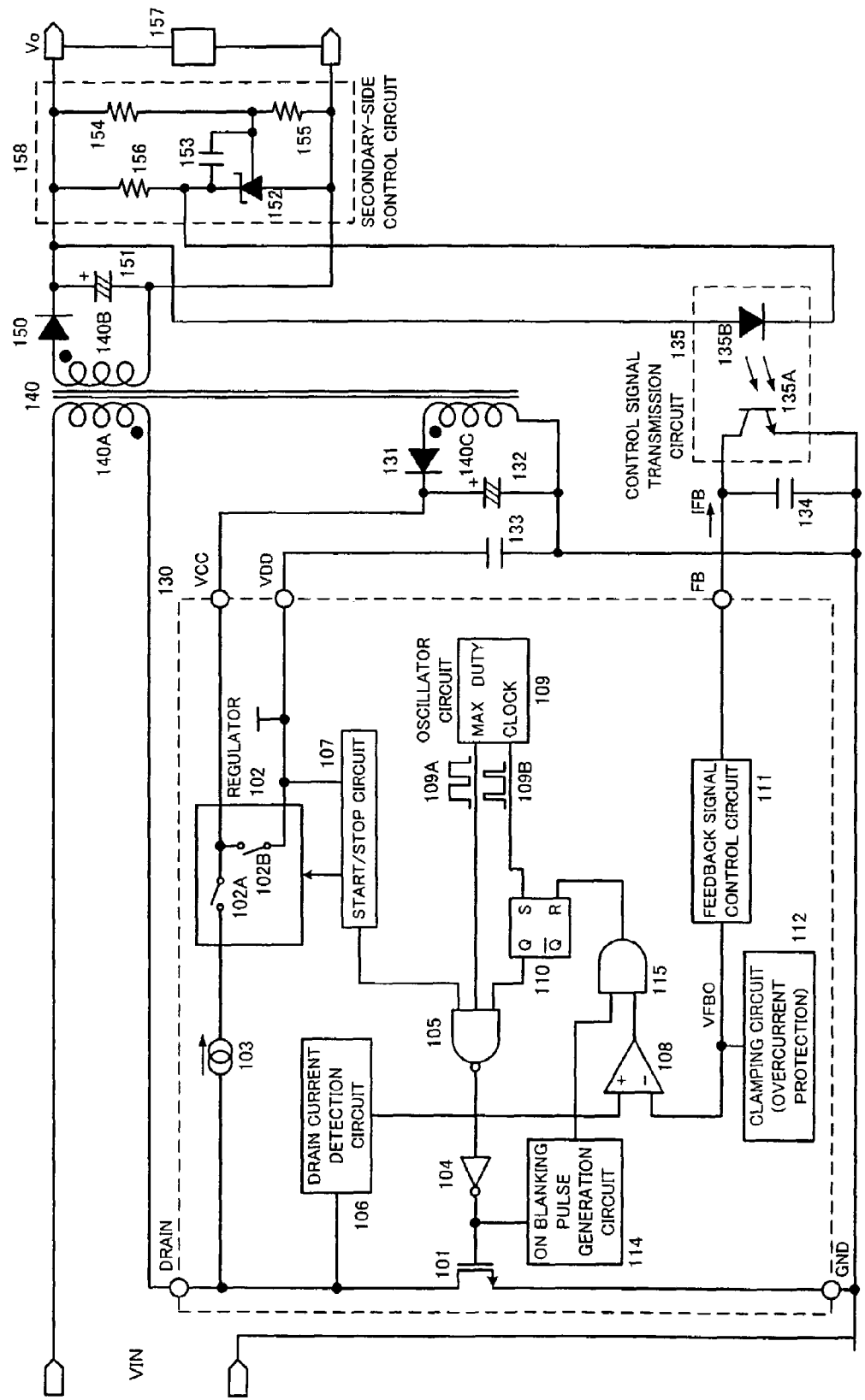
FIG. 10 is a circuit diagram showing a switching power supply of a conventional art.
Figure 11:
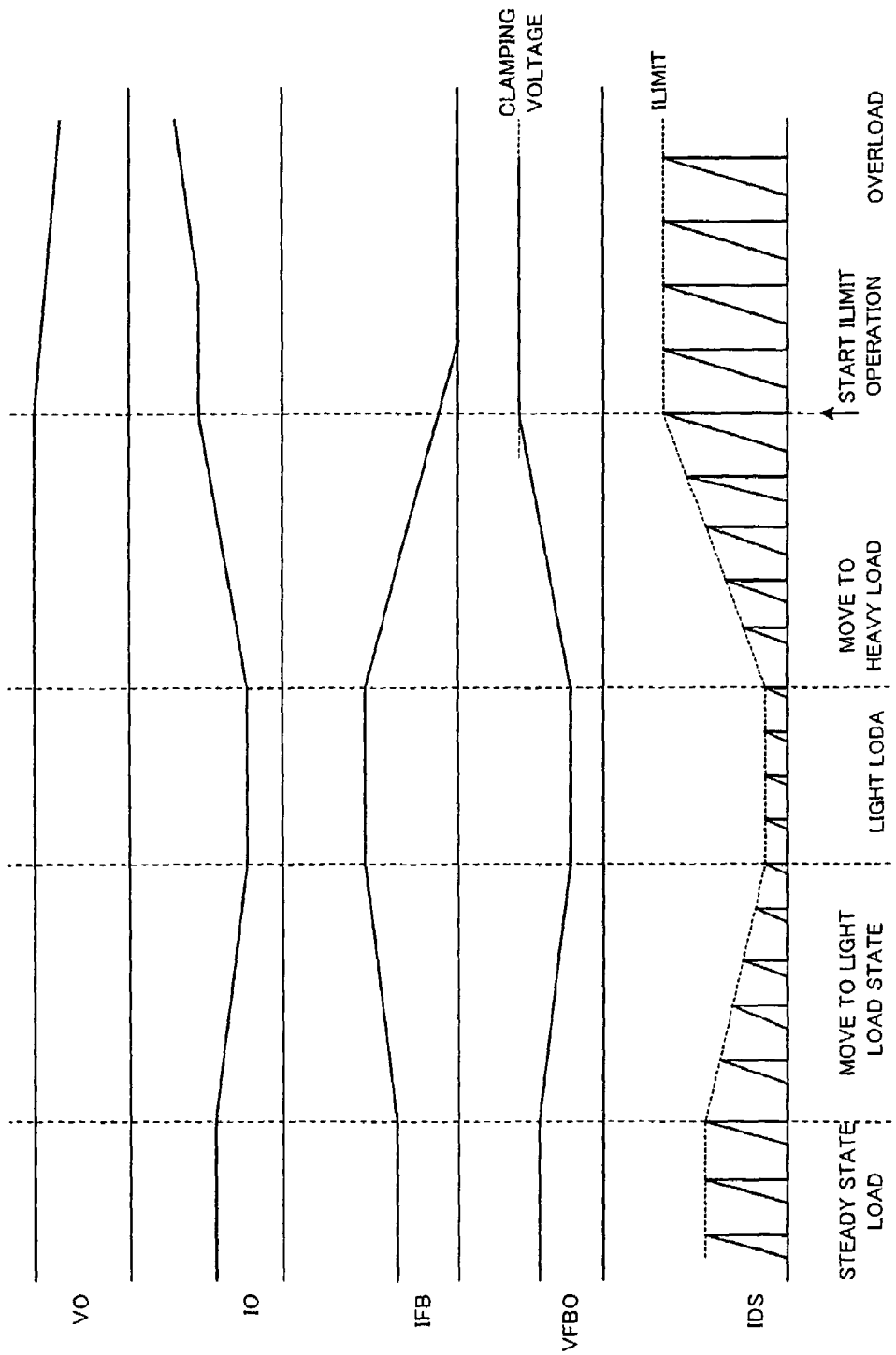
FIG. 11 is a time chart for explaining an operation of the switching power supply according to the conventional art.
Figure 12:
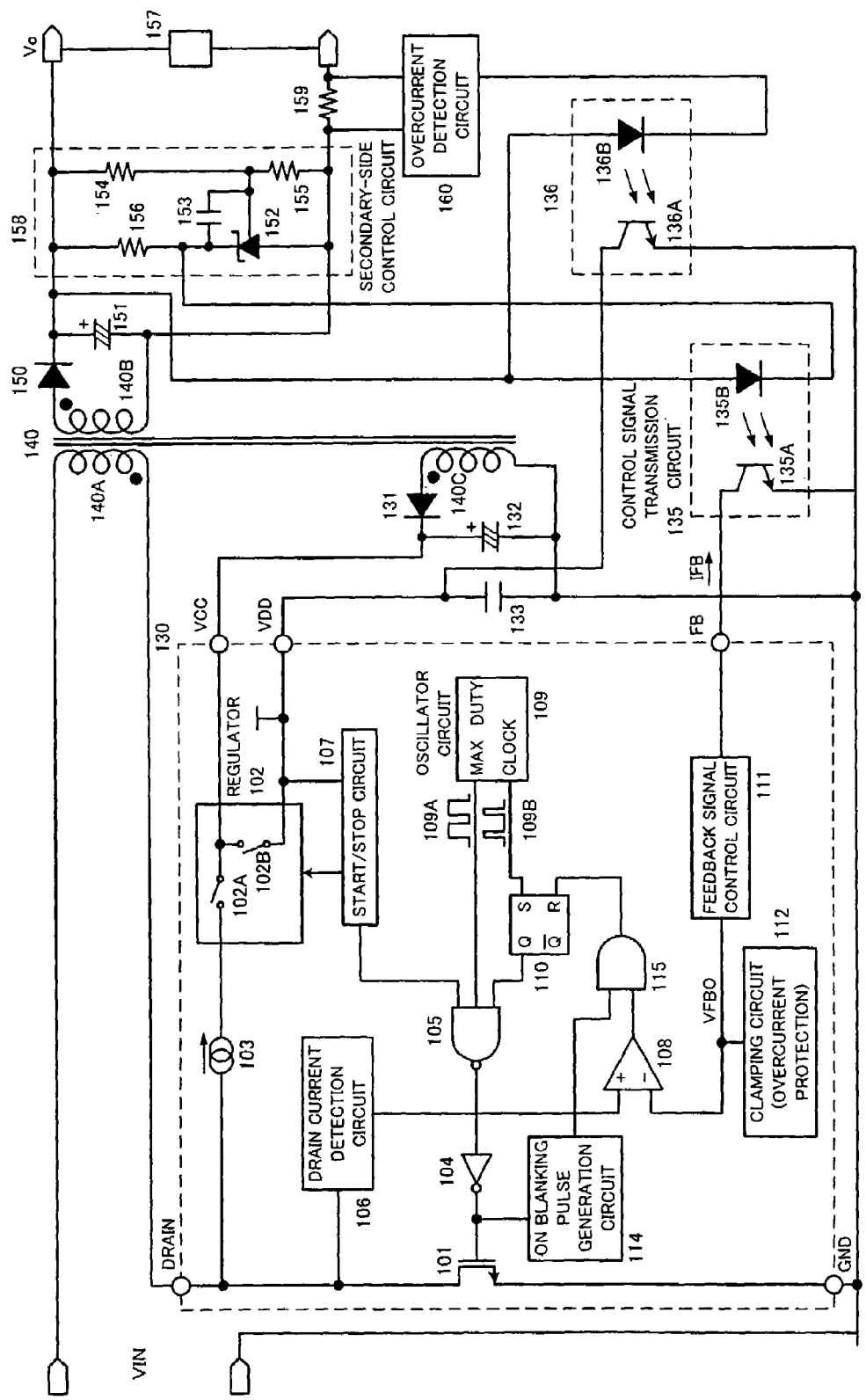
FIG. 12 is a circuit diagram showing a switching power supply according to another conventional art.

Referring to FIGS. 1, 7, and 8, the operations of the switching power supply configured thus will be described below. FIGS. 7 and 8 are time charts for explaining the operation waveforms of parts shown in FIG. 1.

In FIG. 1, a direct voltage VIN generated by, e.g., rectifying and smoothing a commercial AC power supply is inputted to the input terminal. VIN is applied to the DRAIN terminal of the semiconductor device 30X via the primary winding 40A of the transformer 40.

Then, starting current generated by the starting constant current source 3 is applied through the switch 2A in the regulator 2 and charges the capacitor 32 connected to VCC, so that the voltage of VCC increases. Since the switch 2B in the regulator 2 operates in such a way that VDD has a constant voltage, the starting current partially charges the capacitor 33 connected to VDD via the switch 2B, so that the voltage of VDD increases.

When VCC increases and reaches a starting voltage set in the start/stop circuit 7, the switching operation of the switching element 1 is started. When the switching operation is started, energy is supplied to the windings of the transformer 40 and thus current is applied to the secondary winding 40B and the primary auxiliary winding 40C.

Current applied to the secondary winding 40B is rectified and smoothed by the diode 50 and the capacitor 51 into direct-current power and the power is supplied to the load 57.

Since the switching operation is repeated, the output voltage VO gradually increases. When the output voltage VO reaches a voltage set in output voltage detection resistors 54 and 55, a current applied to the photodiode 35B increases in response to a signal from the secondary-side control circuit 58.

Then, a current applied to the phototransistor 35A increases and a current applied from the FB terminal also increases.

When a current IFB of the FB terminal increases, a voltage VFBO inputted to the comparator 8 decreases and thus the drain current applied to the switching element 1 decreases. Such a negative feedback stabilizes the output voltage VO.

The following will describe startup, particularly soft start according to FIGS. 1 and 7. When a voltage is applied to the input terminal, VDD increases as described above.

When VDD reaches a starting voltage, the circuit starts operating, a constant current for charging the capacitor 34 starts flowing, and VFB starts increasing. At this point, since the capacitor 34 carries no charge, IFB sharply rises and then gradually decreases. That is, the output VFBO of the feedback signal control circuit gradually increases from a voltage lower than the light load detection voltage. Thereafter, when the output VFBO of the feedback signal control circuit increases to a light load detection upper limit voltage VR2 or higher, the switching element 1 starts a switching operation. In this case, the peak value of the drain current IDS is about 20% of the overcurrent protection level ILIMIT at the start of the switching operation. Then, as VFB increases, IFB decreases. As VFBO increases, IDS has a higher peak value. Soft start is performed in this manner at the start of the switching operation.

Soft start can prevent an overshoot which is caused by a sharp increase in output voltage upon startup. Further, it is possible to prevent a sharp increase in drain current, thereby reducing the stress of the constituent components.

Referring to FIGS. 1 and 8, the following will describe a light load intermittent operation shifted from a steady operation and recovery from the light load intermittent operation.

When a transition is made from a steady-state load to a light load, the secondary-side control circuit 58 detects a small increase in the output voltage VO and the voltage of the reference terminal of the shunt regulator 52 increases, so that a current drawn from the cathode of the shunt regulator 52 increases, a current applied to the photodiode 35B increases, and the current IFB drawn from the FB terminal increases via the phototransistor 35A. Accordingly, the output voltage VFBO of the feedback signal control circuit decreases and the peak value of drain current flowing to the switching element 1 gradually decreases. As the load becomes lighter, IFB further increases, VFBO decreases, and the peak value of the drain current further decreases.

Thereafter, when IFB further decreases and VFBO becomes lower than a light load lower limit voltage VR1, an "L" signal is outputted from the light load detecting comparator 17, the switching operation is stopped, and a transition is made to a light load stop state. At this point, the light load reference voltage source is changed to the light load upper limit voltage VR2 concurrently with the stop of the switching operation. When the switching operation is stopped, the secondary-side control circuit 58 detects a small decrease in the output voltage VO and the voltage of the reference terminal of a regulator 52 decreases, so that a current drawn from the cathode of the shunt regulator 52 decreases, a current flowing to the photodiode 35B decreases, the current IFB drawn from the FB terminal decreases via the phototransistor 35A, and the output voltage VFBO of the feedback signal control circuit increases. When the output voltage VFBO reaches the light load upper limit voltage VR2, the switching operation is started again. As long as a light load state and a no-load state continue, the above operation is repeated. As the switching operation of the switching element 1, an intermittent operation is performed which alternately repeats a switching period and a switching stop period. Thus, it is possible to reduce power consumption in a light load state and a no-load state. In the light load intermittent operation, the value of the light load reference voltage source is set so as to have the peak value of the drain current at about 15% of the overcurrent protection level ILIMIT, which is determined by the clamping circuit, at a transition from the switching operation to the light load stop state, and the peak value of the drain current at about 20% of ILIMIT at a transition from the light load stop state to the operating state. When the peak value of the drain current is too large during the intermittent operation, the transformer has a sound. When the peak value is too small, power consumption increases. Hence, the intermittent operation with the foregoing values is appropriate.

Further, in the recovery from the light load stop state, the above starting operation similar to soft start can prevent a sharp increase in the output voltage and the drain current.

Referring to FIGS. 1 and 8, the following will discuss an operation when a transition is made from a steady state to an overload state. When the load 57 on the secondary side is in an overload state, the output voltage VO decreases, a reduction in the output voltage VO is detected with resistances divided by the detection resistors 54 and 55 of the secondary-side control circuit 58, a voltage proportionate to the output voltage is inputted to the reference terminal of the shunt regulator 52, and a current applied to the photodiode 35B decreases. Finally, no current is applied to the photodiode 35B and the capacitor 34 is charged by feedback current. When the overload state continues, charging to the capacitor 34 further continues and the voltage VFB of the feedback terminal keeps increasing. When the voltage VFB of the feedback terminal is detected by the feedback voltage detection circuit 13 and the feedback voltage VFB reaches the voltage VFB (OLP) where a transition is made to an overload stop state, a signal VOLP for stopping the switching operation is outputted from the feedback voltage detection circuit 13, the VOLP signal is inputted to the start/stop circuit 7, and a signal for stopping the switching operation is outputted from the start/stop circuit 7.

At the same time, a signal for forcibly discharge the feedback terminal is transmitted from the start/stop circuit 7 to the feedback signal control circuit 11X, so that the voltage of the feedback terminal sharply declines.

In the operations in the overload state, from when the drain current applied to the switching element 1 reaches the overcurrent protection level ILIMIT to when the switching element is stopped in an overload state, there is a time lag from when the voltage of the feedback terminal starts rising to when the voltage reaches the overload detection voltage VFB (OLP).

Hence, even when the load 57 has a peak load for a period of time, the switching operation is not stopped immediately during overload protection.

Figure 13:
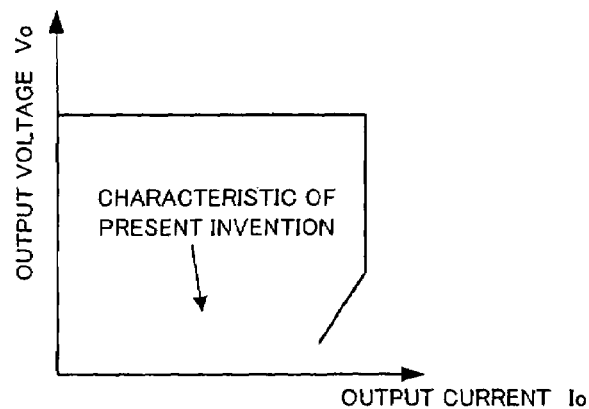
FIG. 13 is a characteristic diagram showing an output voltage-output current characteristic of the switching power supply according to Embodiment 1 of the present invention.
Figure 14:
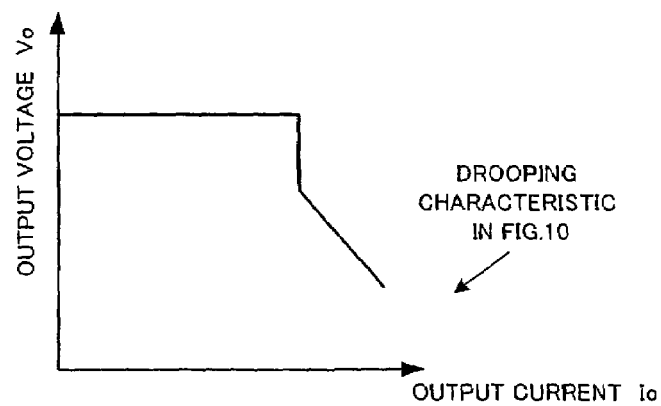
FIG. 14 is a characteristic diagram showing an output voltage-output current characteristic of the switching power supply according to the conventional art.
Figure 15:
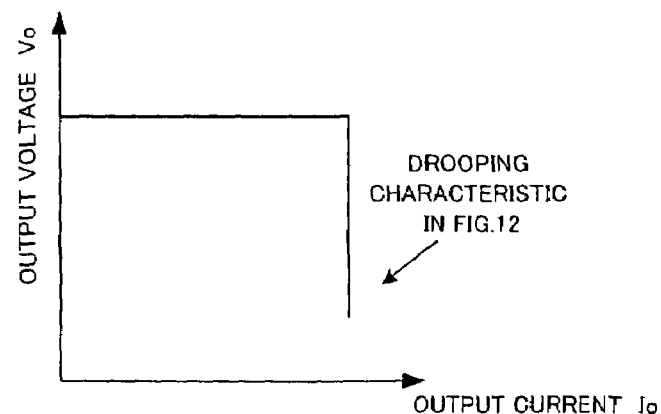
FIG. 15 is a characteristic diagram showing an output voltage-output current characteristic of the switching power supply according to the another conventional art.

In the relationship between the output voltage and the output current, even when the output voltage decreases in an overload state, overload protection shown in FIG. 13 finally works.

Figure 4:
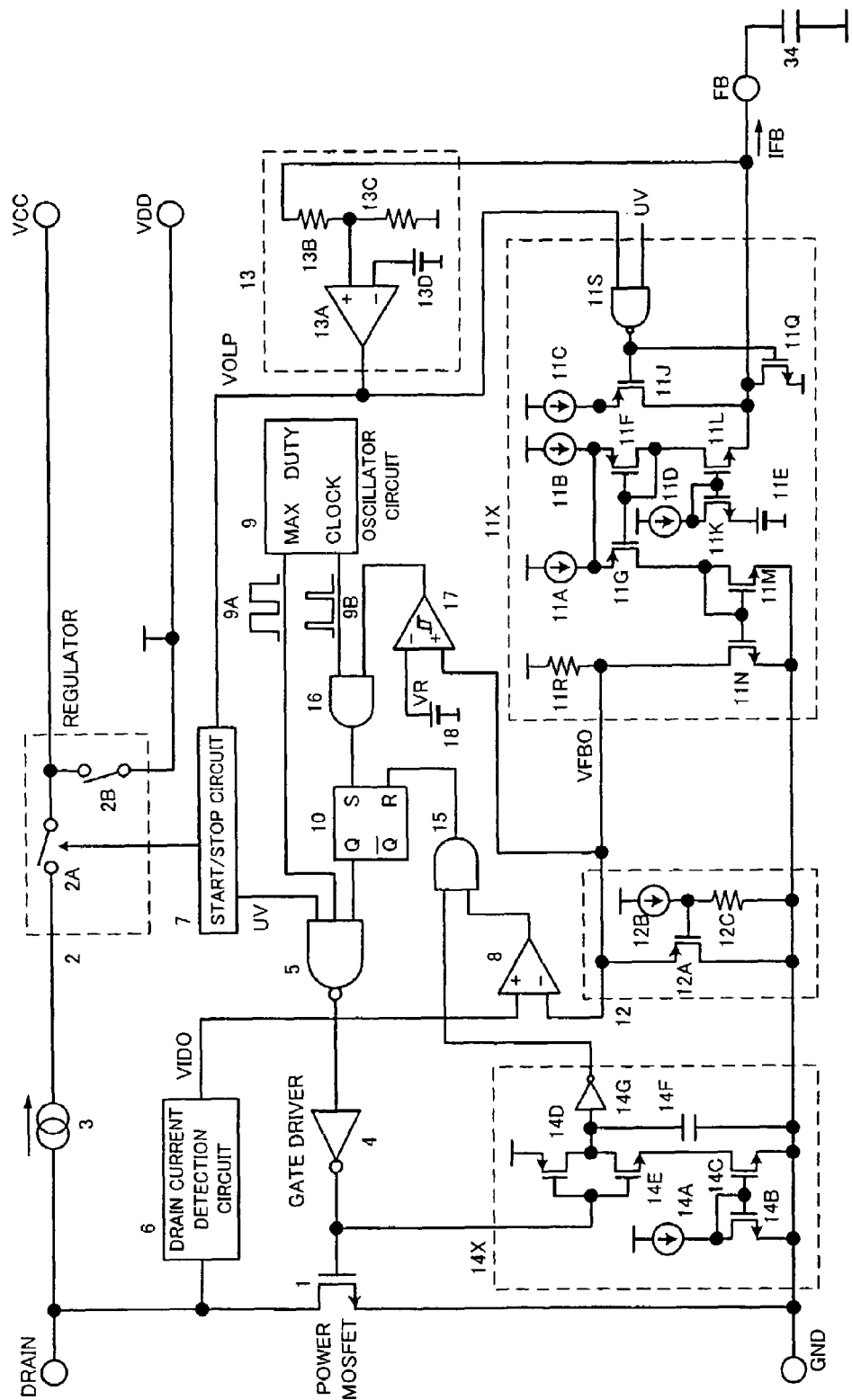
FIG. 4 is a circuit diagram showing a semiconductor device for controlling the switching power supply according to Embodiment 1 of the present invention.

FIG. 4 is a circuit diagram showing another example of the semiconductor device for controlling the switching power supply, the semiconductor device constituting the switching power supply of the present invention. FIG. 4 specifically shows the internal circuit of the semiconductor device 30X shown in FIG. 1. Reference numerals in FIG. 4 correspond to those of FIG. 1 and thus the explanation of the same constituent elements is omitted.

In FIG. 4, the feedback signal control circuit 11X is constituted of constant current sources 11A, 11B, 11C, and 11D, a reference voltage source 11E, P-type MOSFETs 11F, 11G, and 11J, N-type MOSFETs 11K, 11L, 11M, 11N, and 11Q, a resistance 11R, and a NAND circuit 11S.

During startup when an output signal UV from the start/stop circuit is in "H" state, the N-type MOSFET, 11Q is turned off and the P-type MOSFET is turned on. When the feedback current IFB increases which serves as an input signal to the feedback signal control circuit 11X, a current applied to the P-type MOSFETs 11F and 11L increases. Further, a current applied to the P-type MOSFET 11G, which makes a mirror connection to the P-type MOSFET 11F, also increases, a current applied to the N-type MOSFET 11M increases, and a current applied to the N-type MOSFET 11N, which makes a mirror connection to the N-type MOSFET 11M, also increases. Thus, a large potential drop occurs on the resistance 11R and the output signal VFBO of the feedback signal control circuit 11X decreases in voltage.

That is, as the feedback current IFB increases, which serves as an input signal of the feedback signal control circuit 11X, the output signal VFBO of the feedback signal control circuit 11X decreases and the drain current of the switching element 1 has a lower peak value. Further, as the feedback current IFB decreases, which serves as an input signal of the feedback signal control circuit 11X, the output signal VFBO of the feedback signal control circuit 11X increases and the drain current of the switching element 1 has a higher peak value.

At this point, a connection is made so that the voltage VFB of the feedback terminal for receiving the input signal of the feedback signal control circuit 11X is kept at a constant potential by a source potential of the N-type MOSFET 11L making a mirror connection to the N-type MOSFET 11K, in which a current from the constant current source 11D is connected to the drain terminal and the reference voltage source 11E is connected to the source terminal. The voltage VFB of the feedback terminal is kept at a constant potential in this way, thereby stably transmitting an input signal to the feedback signal control circuit.

As the feedback current IFB decreases, the output signal VFBO of the feedback signal control circuit 11X increases and the maximum value is clamped by the clamping circuit 12. The clamping circuit 12 is constituted of a P-type MOSFET 12A, a constant current source 12B, and a resistor 12C and operates so as to clamp the signal VFBO with a voltage determined by summing a voltage of the P-type MOSFET 12A and a voltage which is a product of a current supplied from the constant current source 12B and a resistance of the resistor 12C. The clamping voltage of the clamping circuit 12 determines the maximum current of the switching element 1, i.e., the overcurrent protection level ILIMIT.

As the feedback current IFB increases, the output signal VFBO of the feedback signal control circuit 11X decreases. When the output signal VFBO of the feedback signal control circuit 11X decreases to the light load reference voltage source VR, an "L" signal is outputted from the light load mode detecting comparator 17 to the AND circuit 16 and an "L" signal is inputted to the set terminal of the RS flip-flop circuit 10, so that the switching operation of the switching element 1 is stopped.

Before startup, the output signal UV from the start/stop circuit 7 is in "L" state. In this state, the N-type MOSFET 11Q serving as a device for discharging the feedback terminal is turned on and the voltage VFB of the feedback terminal is fixed at a GND potential. Thereafter, during startup when the output signal UV from the start/stop circuit 7 is in "H" state, the N-type MOSFET 11Q serving as a device for discharging the feedback terminal is turned off, the supply of current to charge the capacitor 34 is started, the feedback current IFB rapidly increases, the voltage of the feedback terminal VFB gradually increases, and the feedback current IFB gradually decreases. In this way, the output signal VFBO of the feedback signal control circuit 11X gradually increases from the GND potential during startup. When VFBO keeps rising to the light load reference voltage source VR, the switching element 1 starts the switching operation. Additionally, the drain current of the switching element 1 has a peak value which is about 20% of the overcurrent protection level ILIMIT, thereby performing soft start with a gradual increase.

The feedback voltage detection circuit 13 is constituted of a comparator 13A, resistors 13B and 13C, and a reference voltage source 13D and detects a rise in the voltage VFB of the FB terminal which receives the input signal of the feedback signal control circuit 11X. When VFB increases to the same potential as the reference voltage source 13D and a voltage divided by the resistors 13B and 13C, an overload stop signal VOLP "L" is outputted from the comparator 13A. The VOLP signal is inputted to the start/stop circuit 7 and VFB increases. When an overload state is detected, the switching operation is stopped. Further, when VFB increases and the signal VOLP is in "L" state, a signal is simultaneously outputted from the feedback voltage detection circuit 13 to turn on the N-type MOSFET 11Q serving as a device for discharging the feedback terminal, and the voltage VFB of the feedback terminal is fixed at the GND potential. Hence, recovery from an overload stop state can be quickly stabilized like normal startup.

In the feedback signal control circuit 11X, the capacitor 34 can be charged to a certain degree by current from the constant current source 11B. However, as described above, the FB voltage can be increased only to a feedback voltage by the constant current source 11B because the constant current source 11D, the reference voltage source 11E, and N-type MOSFETs 11K and 11L making a mirror connection are provided for stabilizing operations. Thus, a constant current source 11C and a P-type MOSFET 11J are additionally provided as devices for charging the capacitor 34. That is, the voltage of the FB terminal for deciding an overload stop state is set between the feedback voltage and the power supply voltage VDD. The current 11C for charging the capacitor 34 is set at a small value not affecting a normal operation, relative to a feedback current value reaching a light load stop state.

For example, when IFB is about 200 $\mu$A at a transition to a light load stop state, the constant current source 11C is set at, e.g., about 20 $\mu$A which is 10% of IFB.

The on blanking pulse generation circuit 14X is constituted of a constant current source 14A, N-type MOSFETs 14B, 14C, and 14E, a P-type MOSFET 14D, a capacitor 14F, and an inverter circuit 14G. When the output signal from the gate driver 4 is set at "H" to turn on the switching element 1, the "H" signal is inputted to the gates of the P-type MOSFET 14D and the N-type MOSFET 14E.

However, the N-type MOSFET 14C connected to the source of the N-type MOSFET 14E is limited so as to pass a current set in the constant current source 14A. The input of the inverter 14G is kept at "H" state until the capacitor 14F is discharged. Thus, the output of the inverter 14G is kept at "L" state for a period of time. That is, even when the output signal of the gate driver 4 is changed from "L" to "H", the output of the inverter 14G is not immediately changed from "L" to "H". The output is kept at "L" state for a while and then is changed to "H" state.

Figure 16A:
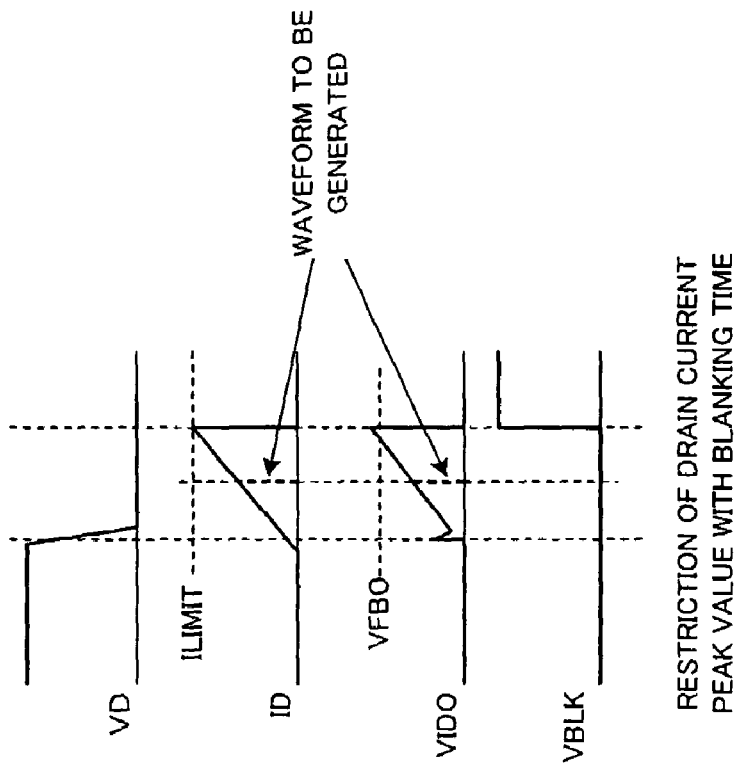
FIG. 16A is a timing chart for explaining a problem caused by a mismatch of a blanking pulse according to the conventional art, showing a heavy load state in which drain current applied to a switching element 1 has a higher peak value.

On blanking time is generated thus for the switching element 1 and thereby a malfunction in overcurrent protection of FIG. 16A can be prevented as shown in FIG. 9C. The malfunction is caused by excessive spike current which is applied due to leakage inductance and so on of the transformer at the instant when the switching element 1 is turned on.

Particularly when the current detection circuit 6 detects a drain current by detecting an on voltage of the drain of the switching element 1, as the drain current increases, the drain voltage decreases at lower speed when the switching element 1 is changed from OFF to ON. Hence, as shown in FIG. 9B, a malfunction can be prevented in the following case: when no blanking time is provided, a current is detected with a high on voltage even though a drain current is lower than a drain current to be generated, and thus a malfunction is likely to occur in overcurrent protection.

Embodiment 2

Figure 2:
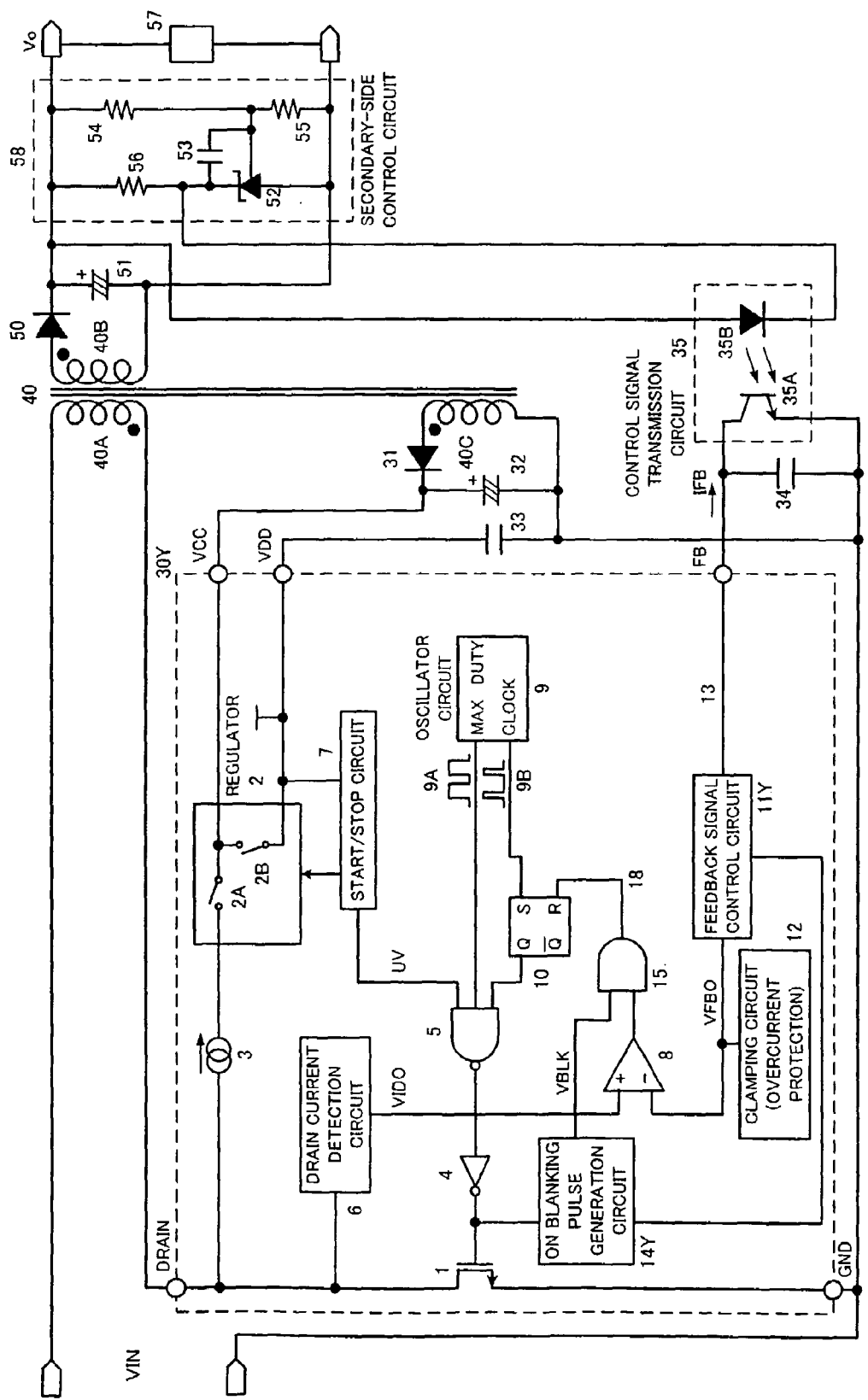
FIG. 2 is a circuit diagram showing a switching power supply according to Embodiment 2 of the present invention.

FIG. 2 is a circuit diagram showing an example of an embodiment of a switching power supply according to the present invention.

In FIG. 2, reference numeral 30Y denotes a semiconductor device for the switching power supply. The semiconductor device is constituted of a switching element 1 and the control circuit thereof.

Reference numerals in FIG. 2 correspond to those of FIG. 1 and thus the explanation of the same constituent elements is omitted.

FIG. 2 is different from FIG. 1 in that an output signal from a feedback signal control circuit 11Y is received by an on blanking pulse generation circuit 14Y as an input signal, and on blanking time from the blanking pulse generation circuit is changed according to a change in feedback current IFB, which is an input signal to the feedback signal control circuit.

That is, the smaller the feedback current IFB, that is, as the drain current of the switching element 1 has a higher peak, a blanking pulse width becomes larger.

Figure 16B:
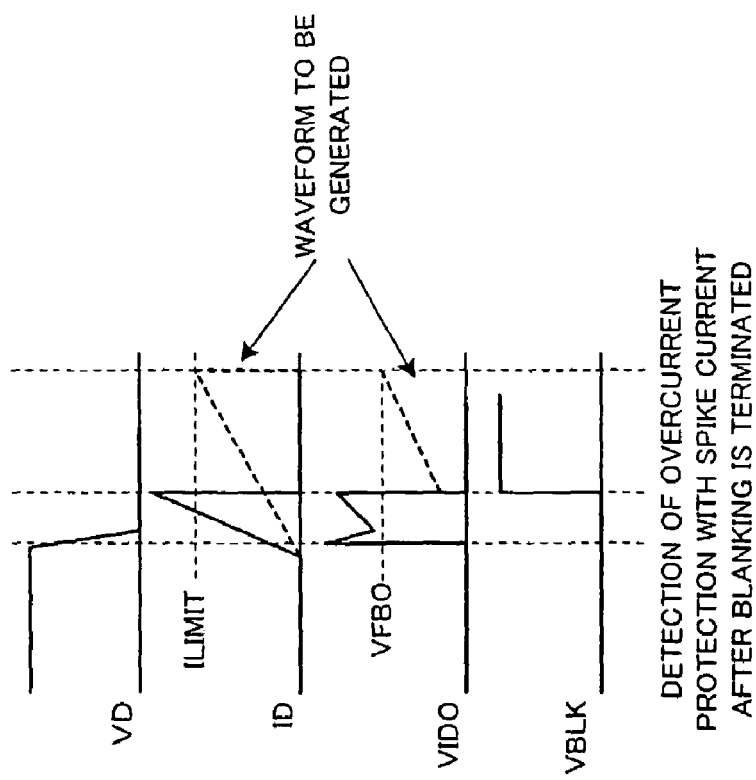
FIG. 16B is a timing chart for explaining a problem caused by a mismatch of a blanking pulse according to the conventional art, showing a light load state in which the drain current of the switching element 1 has a lower peak value.

This operation is effective for waveform clipping shown in FIG. 16A where an erroneous detection occurs in overcurrent protection. The waveform clipping occurs because spike current is increased as the drain current applied to the switching element 1 has a higher peak value at the instant when the switching element 1 is turned on. Further, this operation is effective for the following problem: in a light load state shown in FIG. 16B where the drain current of the switching element 1 has a lower peak, when a blanking pulse width is too large, the peak value of the drain current is restricted by the blanking pulse width, the peak value of the drain current cannot be sufficiently narrowed, and thus the output voltage increases. Blanking time is changed relative to a feedback current, i.e., the magnitude of the peak value of the drain current applied to the switching element 1, so that the foregoing operation is effective for simultaneously solving waveform clipping caused by a malfunction in overcurrent protection and an increase in output voltage at a light load.

The operations of the switching power supply configured thus will be described below in accordance with FIGS. 2 and 9.

As the feedback current IFB decreases, which serves as an input signal to the feedback signal control circuit 11Y, a drain current ID of the switching element 1 has a higher peak value. Accordingly, an operation is performed to have a longer blanking time which is a delay time of the output of the blanking pulse generation circuit 14Y relative to the rising edge of the output signal of the gate driver 4, an operation is performed so as to prevent waveform clipping caused by a malfunction in overcurrent protection, and an operation is performed so as to normally control the drain current at a low peak value even at a light load where the drain current of the switching element 1 has a low peak value.

Figure 5:
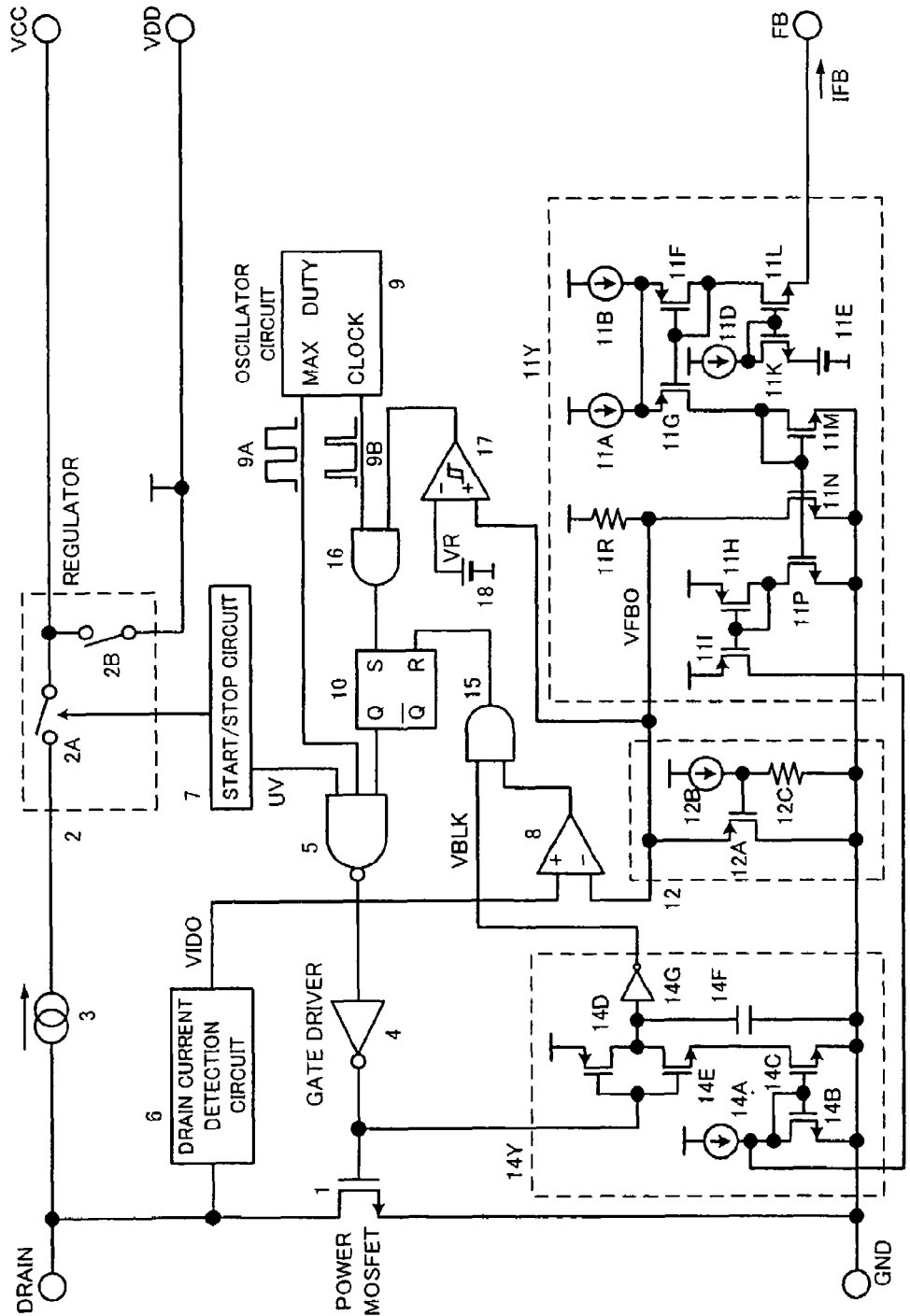
FIG. 5 is a circuit diagram showing a semiconductor device for controlling the switching power supply according to Embodiment 2 of the present invention.

FIG. 5 is a circuit diagram showing an example of the semiconductor device for controlling the switching power supply, the semiconductor device constituting the switching power supply of the present invention. FIG. 5 specifically shows the internal circuit of the semiconductor device 30Y shown in FIG. 2. Reference numerals in FIG. 5 correspond to those of FIGS. 2 and 4 and thus the explanation of the same constituent elements is omitted. FIG. 5 is different from FIG. 4 in the internal configurations of the feedback signal control circuit 11Y and the on blanking pulse generation circuit 14Y and the presence or absence of a connection between the two circuits.

Regarding differences from FIG. 4, the semiconductor device 30Y will be described below according to FIG. 5.

The feedback signal control circuit 11Y is constituted of constant current sources 11A, 11B, and 11D, a reference voltage source 11E for determining an operation potential of a feedback terminal FB, P-type MOSFETs 11F and 11G, and N-type MOSFETs 11K, 11L, 11M, 11N, and 11P, and a resistor 11R.

As the feedback current IFB increases, which is the input signal of the feedback signal control circuit 11Y, a current applied to the P-type MOSFET 11F increases and a current of the P-type MOSFET 11G, which makes a mirror connection to the P-type MOSFET 11F, increases in a similar manner. Accordingly, the N-type MOSFET 11M and the N-type MOSFETs 11N and 11P making a mirror connection to the N-type MOSFET 11M also increase in current. As IFB increases, VFBO decreases, a current applied to the P-type MOSFET 11I increases, and the current is added to a current of the constant current source 14A for determining blanking time of the blanking pulse generation circuit. In this way, the current is transmitted to the blanking pulse generation circuit 14Y.

With this operation, when the feedback current IFB increases, a current applied to the N-type MOSFETs 14E and 14C increases so as to discharge the capacitor 14F at a transition from "L" to "H" of an output signal from a gate driver 4. Thus, a signal outputted from the on blanking pulse generation circuit 14Y has a shorter blanking time.

That is, when the drain current applied to the switching element 1 has a lower peak value, blanking time is shortened. When the drain current has a higher peak value, blanking time is increased.

In either case, short blanking time is set from when "H" is outputted from the gate driver 4 to when an "L" signal is outputted therefrom.

Embodiment 3

Figure 3:
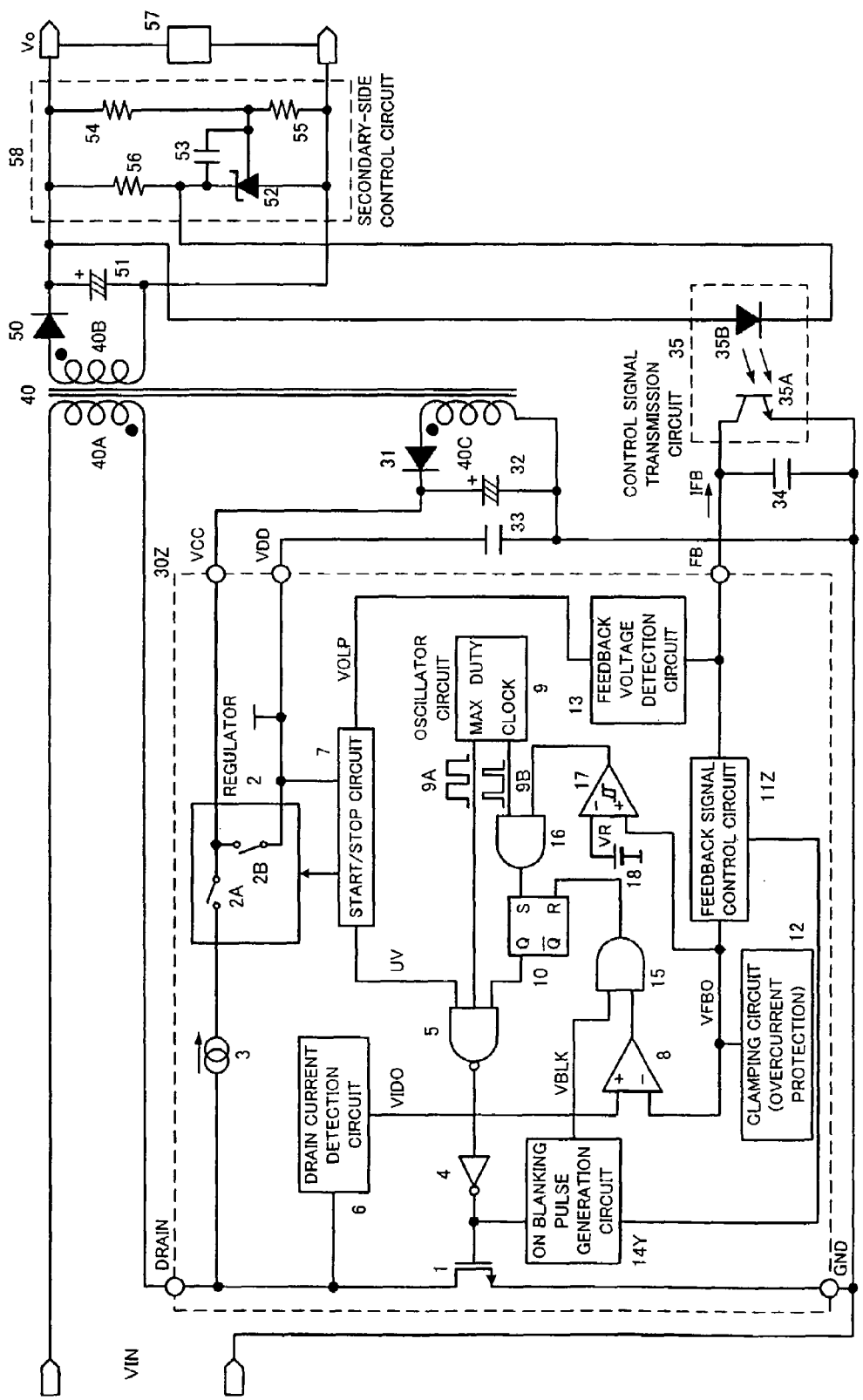
FIG. 3 is a circuit diagram showing a switching power supply according to Embodiment 3 of the present invention.

FIG. 3 is a circuit diagram showing an example of an embodiment of a switching power supply and a semiconductor device according to the present invention.

In FIG. 3, reference numeral 30Z denotes a semiconductor device for controlling a switching power supply. The semiconductor device 30Z is constituted of a switching element 1 and the control circuit thereof.

Reference numerals in FIG. 3 correspond to those of FIGS. 1 and 2 and thus the explanation of the same constituent elements is omitted.

The configuration of FIG. 3 includes the constituent elements shown in FIGS. 1 and 2. By increasing and reducing a feedback current IFB serving as an input signal to a feedback signal control circuit 11Z, a peak value of drain current applied to the switching element 1 is controlled and blanking time outputted from an on blanking pulse generation circuit is changed. Further, an increase in the voltage of an FB terminal is detected for overload protection. When the overload protection works, a switching operation is stopped.

When the feedback current IFB increases and the output voltage of the feedback signal control circuit 11Z becomes lower than a light load reference voltage VR, the switching operation is stopped.

Figure 6:
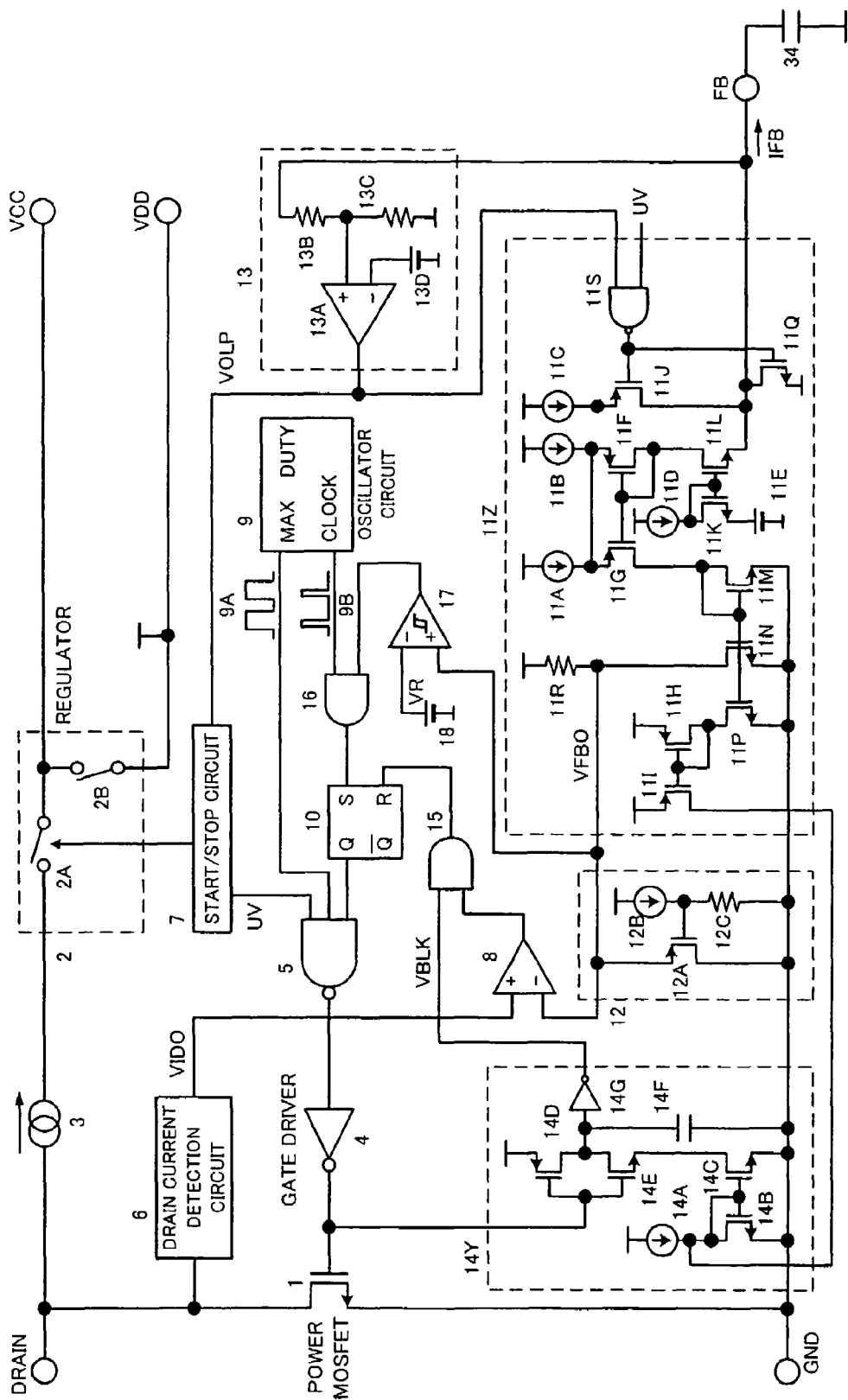
FIG. 6 is a circuit diagram showing a semiconductor device for controlling the switching power supply according to Embodiment 3 of the present invention.

FIG. 6 is a circuit diagram showing an example of the semiconductor device for controlling the switching power supply, the semiconductor device constituting the switching power supply of the present invention. FIG. 6 specifically shows the internal circuit of the semiconductor device 30Z shown in FIG. 3. Reference numerals in FIG. 6 correspond to those of FIGS. 2, 3, 4, and 5 and thus the explanation of the same constituent elements is omitted. FIG. 6 is different from FIG. 5 in that a feedback voltage detection circuit 13 is provided.

(Industrial Applicability)

The switching power supply and the semiconductor device of the present invention are effective as a switching power supply which reduces power consumption at no load and a light load with an overload protecting function, and readily achieves soft start.

What is claimed is:

1. A switching power supply, comprising:
   a transformer,
   a switching element including an input terminal connected to a first primary winding of the transformer and receiving a first direct voltage via the transformer,
   an output voltage generation circuit connected to a secondary winding of the transformer, and rectifying and smoothing a secondary-side output voltage of the transformer, so that a second direct voltage smaller than an absolute value of the first direct voltage is generated and outputted from the first direct voltage,
   an output voltage control circuit for stabilizing the output voltage,
   a control signal transmission circuit for transmitting a signal of the output voltage control circuit to a primary side,
   a control circuit for controlling an operation of the switching element, and
   an auxiliary power supply voltage generation circuit connected to an auxiliary winding of the transformer, the auxiliary power supply voltage generation circuit being for generating a primary-side output voltage, and rectifying and smoothing the generated primary-side output voltage, so that an auxiliary power supply voltage for supplying a power supply voltage to the control circuit is generated and outputted, wherein
   the control circuit comprises:
   a regulator for generating and supplying a power supply voltage of the control circuit from the first direct voltage and the auxiliary power supply voltage, an oscillator circuit for generating and outputting a switching signal applied to the switching element, a current detection circuit for detecting a current applied to the switching element and outputting the current as an element current detection signal, a feedback signal control circuit for outputting a signal from the control signal transmission circuit as a feedback signal, a comparator for comparing the element current detection signal with the output signal of the feedback signal control circuit, and outputting a comparison signal, a switching signal control circuit for controlling an amount of current and an output of the switching signal according to the comparison signal, a clamping circuit for fixing a maximum value of the element current detection signal, a light load mode detecting comparator for comparing an output voltage of the feedback signal control circuit with an internally set light load reference voltage source, and a feedback voltage detection circuit for detecting an input voltage to the feedback signal control circuit, and outputting a switching stop signal when the input voltage is not lower than a specified voltage, wherein a current peak of the switching element is controlled and an intermittent operation is performed in response to a signal to the feedback signal control circuit, and an operation of the switching element is stopped according to an increase in input voltage to the feedback signal control circuit.

2. The switching power supply according to claim 1, wherein the feedback voltage detection circuit detects that the input voltage to the feedback signal control circuit increases to a specified voltage that is not higher than an internal power supply voltage of the control circuit and not lower than an operation voltage of an input terminal for receiving an input signal to the feedback signal control circuit, and the feedback voltage detection circuit stops a switching operation of the switching element.

3. The switching power supply and a semiconductor device according to claim 1, wherein the feedback signal control circuit comprises a constant current source for charging a capacitor connected between a feedback terminal and a GND terminal when a current applied to the switching element is equal to the maximum value set by the clamping circuit, and the feedback terminal increases in current when a secondary side is in an overload state.

4. The switching power supply according to claim 1, wherein the feedback signal control circuit comprises a device for forcibly discharging a feedback terminal before start up prior to start of a switching operation of the switching element, the forced discharge is disabled when the control circuit is in a state enabling startup immediately before the switching element starts a switching operation, and the switching operation is started in a state where the output signal from the feedback signal control circuit decreases to a voltage of the light load reference voltage source, so that an operation for gradually increasing a current peak value of the switching element from a small value, that is, soft start is performed when the switching operation is started.

5. The switching power supply according to claim 1, wherein a terminal voltage for receiving an input signal from the control signal transmission circuit to the feedback signal control circuit is kept at a constant potential in order to stabilize a normal switching operation.

6. The switching power supply according to claim 1, wherein a light load reference voltage source serving as a reference voltage of the light load mode detecting comparator alternately outputs a light load lower limit voltage and a light load upper limit voltage in such a way that a stop signal is outputted to stop a switching operation at 15% of the maximum value of a switching element current, the maximum value being determined by the clamping circuit, and a signal is outputted to restart the switching operation when a recovery is made to 20% of the maximum value of a switching element current.

7. A switching power supply, comprising:

a transformer, a switching element which has an input terminal connected to a first primary winding of the transformer and receives a first direct voltage via the transformer, an output voltage generation circuit which is connected to a secondary winding of the transformer and rectifies and smoothes a secondary-side output voltage of the transformer, so that a second direct voltage smaller than an absolute value of the first direct voltage is generated and outputted from the first direct voltage, an output voltage control circuit for stabilizing the output voltage, a control signal transmission circuit for transmitting a signal of the output voltage control circuit to a primary side, a control circuit for controlling an operation of the switching element, and an auxiliary power supply voltage generation circuit which is connected to an auxiliary winding of the transformer, generates a primary-side output voltage, and rectifies and smoothes the generated primary-side output voltage, so that an auxiliary power supply voltage for supplying a power supply voltage to the control circuit is generated and outputted, wherein the control circuit comprises:

a regulator for generating and supplying a power supply voltage of the control circuit from the first direct voltage and the auxiliary power supply voltage, an oscillator circuit for generating and outputting a switching signal applied to the switching element, a current detection circuit for detecting a current applied to the switching element and outputting the current as an element current detection signal, a feedback signal control circuit for outputting a signal from the control signal transmission circuit as a feedback signal, a comparator for comparing the element current detection signal with the output signal of the feedback signal control circuit, and outputting a comparison signal, a switching signal control circuit for controlling an amount of current and an output of the switching signal according to the comparison signal, a clamping circuit for fixing a maximum value of the element current detection signal, and an on blanking pulse generation circuit for changing time of a blanking width outputted in response to an input from the switching signal control circuit, wherein the current detection circuit detects an on voltage of the switching element to output the element current detection signal, and on blanking time of an output signal from the on blanking pulse generation circuit is changed according to a current peak value of the switching element.

8. The switching power supply according to claim 7, wherein the on blanking pulse generation circuit has a longer on blanking time as a current applied to the switching element has a higher peak value.

9. A switching power supply, comprising:
- a transformer,
- a switching element which has an input terminal connected to a first primary winding of the transformer and receives a first direct voltage via the transformer,
- an output voltage generation circuit which is connected to a secondary winding of the transformer and rectifies and smoothes a secondary-side output voltage of the transformer, so that a second direct voltage smaller than an absolute value of the first direct voltage is generated and outputted from the first direct voltage,
- an output voltage control circuit for stabilizing the output voltage,
- a control signal transmission circuit for transmitting a signal of the output voltage control circuit to a primary side,
- a control circuit for controlling an operation of the switching element, and
- an auxiliary power supply voltage generation circuit which is connected to an auxiliary winding of the transformer, generates a primary-side output voltage, and rectifies and smoothes the generated primary-side output voltage, so that an auxiliary power supply voltage for supplying a power supply voltage to the control circuit is generated and outputted, wherein the control circuit comprises:
- a regulator for generating and supplying a power supply voltage of the control circuit from the first direct voltage and the auxiliary power supply voltage,
- an oscillator circuit for generating and outputting a switching signal applied to the switching element,
- a current detection circuit for detecting a current applied to the switching element and outputting the current as an element current detection signal,
- a feedback signal control circuit for outputting a signal from the control signal transmission circuit as a feedback signal,
- a comparator for comparing the element current detection signal with the output signal of the feedback signal control circuit, and outputting a comparison signal,
- a switching signal control circuit for controlling an amount of current and an output of the switching signal according to the comparison signal,
- a clamping circuit for fixing a maximum value of the element current detection signal,
- a light load mode detecting comparator for comparing an output voltage of the feedback signal control circuit and an internally set light load reference voltage source,
- a feedback voltage detection circuit for detecting an input voltage to the feedback signal control circuit, and outputting a switching stop signal when the input voltage is not lower than a specified voltage, and
- an on blanking pulse generation circuit for changing on blanking time in response to an input from the switching signal control circuit,
- a current peak of the switching element is controlled and an intermittent operation is performed in response to a signal to the feedback signal control circuit, and an operation of the switching element is stopped according to an increase in input voltage to the feedback signal control circuit,
- the current detection circuit detects an on voltage of the switching element to output the element current detection signal, and
- on blanking time of an output signal from the on blanking pulse generation circuit is changed according to a current peak value of the switching element.

10. The switching power supply according to claim 1, wherein the switching power supply is constituted of a semiconductor device in which the switching element and the control circuit are formed on the same semiconductor substrate.

11. The switching power supply according to claim 7, wherein the switching power supply is constituted of a semiconductor device in which the switching element and the control circuit are formed on the same semiconductor substrate.

12. The switching power supply according to claim 9, wherein the switching power supply is constituted of a semiconductor device in which the switching element and the control circuit are formed on the same semiconductor substrate.

* * * * *